W. A. COATES.
EYEGLASS MOUNTING.
APPLICATION FILED NOV. 18, 1916.
1,261,361. Patented Apr. 2, 1918.
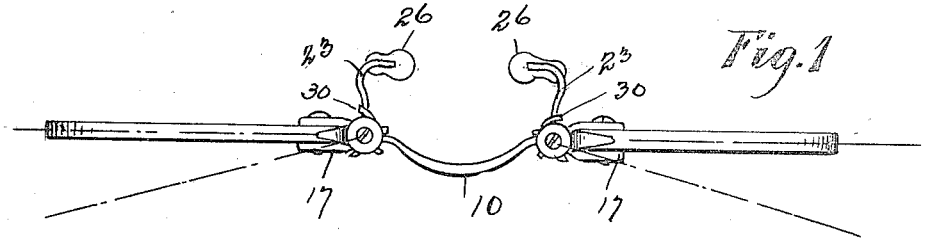
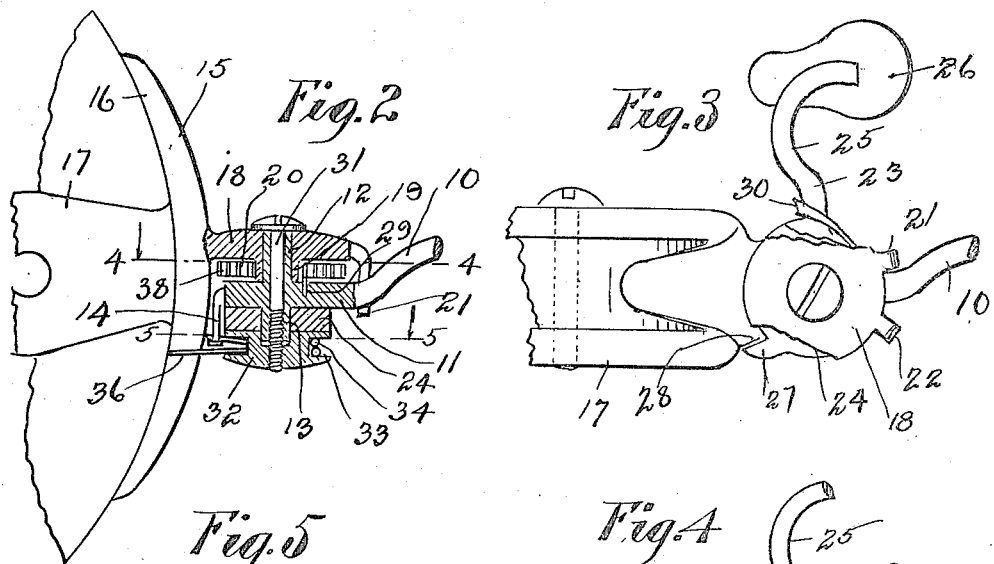
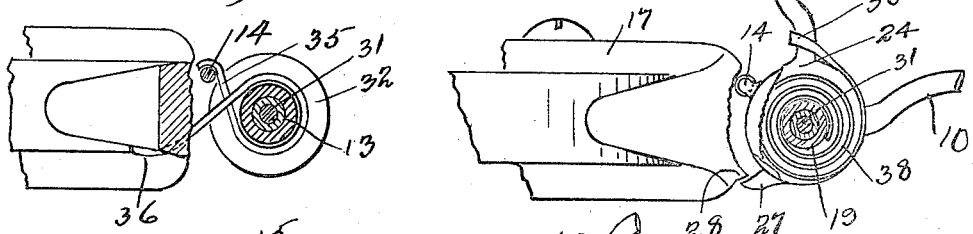
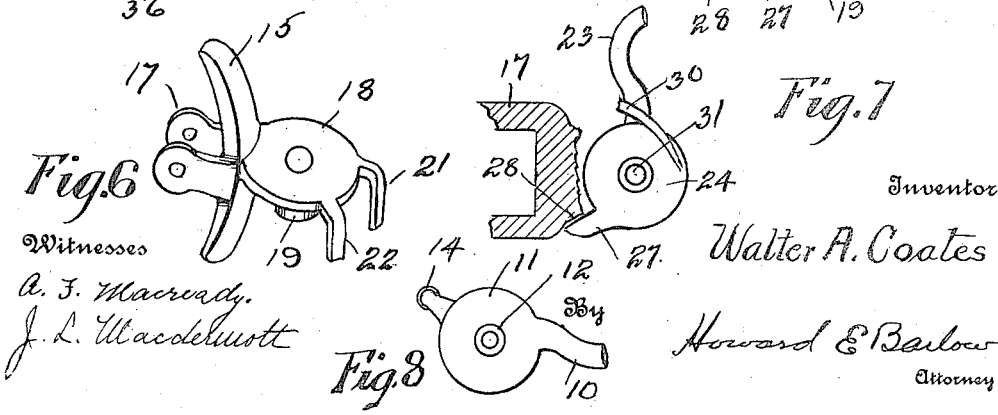
Inventor
Walter A. Coates
By Howard E Barlow
Attorney
Witnesses
A. J. Macready
J. L. Macdermott

UNITED STATES PATENT OFFICE.

WALTER A. COATES, OF PROVIDENCE, RHODE ISLAND.

EYEGLASS-MOUNTING.

1,261,361. Specification of Letters Patent. Patented Apr. 2, 1918.

Application filed November 18, 1916. Serial No. 132,000.

*To all whom it may concern:*

Be it known that I, WALTER A. COATES, a citizen of the United States, and resident of the city of Providence, in the county of Providence and State of Rhode Island, have invented certain new and useful Improvements in Eyeglass-Mountings, of which the following is a specification.

This invention relates to eyeglass mountings, and has for its object to provide a mounting of the swing lens type in which the lens clamps are pivotally mounted on the ends of the nose bridge member to swing forward for the purpose of separating the nose grips, whereby the mounting may be placed upon and removed from the nose of the wearer by the swinging of the lens forward from their normal plane, thereby obviating the use of the finger grips or forwardly extending portion of the usual finger piece mountings.

It is found in practice that these finger grips or forward extending portions are in some cases quite objectionable, for instance they are in the way and often catch and become entangled in a woman's veil, but by my improved construction these projecting portions are entirely eliminated.

A further object of the invention is to provide means whereby the nose grips are capable of movement independent of the swinging action of the lens clamps, whereby the lenses are returned to a position in alinement with each other, and yet the nose grips are free to adjust themselves to a limited degree to noses of different shapes and sizes.

A still further object of the invention is to provide a simple and compact construction of the pivotal joint and whereby a lens clamp member may be readily removed without disturbing the other members of the mounting.

The invention further consists in the provision of a tubular trunnion on the nose bridge member which the other members of the mounting may rotate and receive a bearing.

A still further object of the invention is to provide a stop whereby the lens clamps when under action of their spring return the lenses into alinement with each other.

The invention further consists in the provision of two separate springs operating independently, one upon the lens clamps and the other upon the nose grips.

With these and other objects in view, the invention consists of certain novel features of construction, as will be more fully described and particularly pointed out in the appended claims.

In the accompanying drawings:

Figure 1— is an edge view of the mounting showing the lenses in their normal position in which they are in alinement one with the other; also indicating by center lines the forward movement of which the lenses are capable of separating the nose grips.

Fig. 2— is a greatly enlarged central longitudinal section through the pivotal joint at one end of the nose bridge.

Fig. 3— is a top view of this joint showing portions of the different members broken away to better illustrate the action of these members.

Fig. 4— is a section on line 4—4 of Fig. 2 showing the general arrangement of spring which acts upon the nose gripping member.

Fig. 5— is a section on line 5—5 of Fig. 2 showing the spring which acts upon the lens clamp.

Fig. 6— is a perspective view showing the lens clamp member with its two downwardly projecting stop fingers, one to limit the forward and the other the backward movement swing of the lens.

Fig. 7— is a plan view of a portion of a nose gripping member.

Fig. 8— is a detail plan view of the enlarged end of the nose bridge.

Referring to the drawings, 10 designates the nose bridge member of my improved swing lens mounting, the ends of which bridge have enlarged flattened portions or lugs 11, see Fig. 8, and these lugs are each provided with a central upwardly turned tubular portion 12; and also a downwardly turned tubular portion 13, see Fig. 2, and an abutting finger 14 projects downwardly from the rear of this lug. A lens clamp member 15 is provided with lens straps and with a saddle 17 and is also provided with a forwardly extending lug 18. The under side of this clamp lug is provided with a downwardly extending portion 19 which fits over the upwardly extending tubular portion 12 of the nose bridge lug, thereby providing a space 20 between these lugs in which a spring hereinafter described is housed. This clamp lug 18 is provided with a downwardly extending finger 21 which engages the back side of the bridge and serves as a stop to cause the lenses to stop in alinement one with the other when forced back to normal position under tension of their respective springs.

This pad 18 is also provided with a downwardly extending finger 22 spaced from the finger 21 and which finger 22 is adapted to engage the bridge member on its forward side, to limit the forward swinging motion of the lens.

The nose gripping member 23 is provided with a flat lug 24 which is mounted on the trunnion 13 beneath the bridge lug 11 to rotate thereon, and this nose gripping member is provided with a bendable arm 25 and a pad 26 which is one of the two that contacts with the sides of the nose to hold the mounting in position thereon.

This nose grip lug 24, see Fig. 7, is provided with a stop finger 27 which engages the portion 28 on the lens clamp to serve a double purpose: first, to limit the inward swing of the nose gripping pad and second, to provide means whereby when the lenses are swung forward, their finger 27 is engaged by these nose grips and caused to open or spread apart so as to yieldingly permit the positioning of the mounting upon the nose of the wearer.

In order to provide a suitable tension for this nose grip, I have mounted a spirally coiled spring 38 in the space 20, see Fig. 2, between the lens clamp lug and the nose bridge lug, the inner end 29 of this spring engages the nose bridge lug and its outer end 30 is hooked over the arm 23 of the nose gripping member, thereby normally pressing the grips inward against the nose of the wearer.

In order to secure all of these members together, I have passed a screw 31 down through the tubular trunnions, the lower end of the screw being threaded in the lower trunnion 13 and a nut 32 is threaded onto the extremity of the screw and is turned up into position to secure all of the different members together. This nut 32 is provided with a deep circular groove 33 in which is wound a coil spring 34, one end 35 of this spring engages the finger 14 while the opposite end 36 engages the saddle 15 of the lens clamp thereby exerting a pressure upon the lens clamps to move them backward until their stop finger brings up against the bridge member 10 at which time both of the lenses are in alinement one with the other.

By my improved construction, it will be seen that in order to remove the lens clamp which is to be done quite often, it is simply necessary to turn back the screw 31 and slide off the lens clamp for inspection or repairs.

Another feature as is herein illustrated is that the two springs, one operating the nose grips and the other operating the lens clamps, are entirely separate and independent of each other, thereby providing the nose grip with a motion independent of the action of the grip within certain limits without interfering with the perfect alinement of the lenses.

Having thus described one illustrative embodiment of my invention, I desire it to be understood that the details of construction may be varied without departing from the spirit of the invention, the scope of which is defined by the appended claims.

I claim:

1. An improved eyeglass mounting comprising a rigid bridge, spring pressed lens clamp members pivotally connected to the ends of said bridge and normally in alinement with each other, spring pressed nose grip members also pivotally mounted on the ends of said bridge independently of the clamp members, and capable of movement independent of that of said clamp members, and means whereby a forward swing of said clamp members separates said grips.

2. An eyeglass mounting comprising a rigid bridge, lens clamp members pivotally connected to the ends of said bridge to swing forwardly from a medial line through both, a spring for returning said clamp members to normal position, each clamp member having a stop to prevent a rearward swing beyond the medial line, nose grip members mounted to swing independently of said clamp members, a separate spring acting on said members, and means carried by said grip members to engage said clamp members at a point spaced from said stop to cause the forward swing of the lenses to separate the nose grips.

3. An improved eyeglass mounting comprising a rigid bridge having a flattened lug, a lens clamp member pivotally connected to said lug and bearing on one face thereof, a nose grip member pivoted to said lug and bearing on the other face thereof and free to swing independently of said clamp member, independent springs acting upon said grip and clamp member respectively, and means for causing a swing of the lenses to impart movement to the nose grip.

4. An eyeglass mounting comprising a rigid bridge having a lug on each end thereof, a pivotal trunnion on each lug, a lens clamp having a lug mounted to swing on said trunnion and spaced from said bridge lug, a nose grip member mounted on the bridge lug, a spring in said space having one end connected to said bridge and its opposite end to said grip member, a separate and independent spring acting between said bridge and said clamp to hold the lenses normally in alinement, a screw passing through all of said members, a nut on said screw operatively securing the whole together, and means for causing movement of the lens clamps to impart movement to the nose grip members.

5. An eyeglass mounting comprising a rigid bridge having lugs on its ends each provided with an upwardly turned trunnion and a downwardly extended trunnion, lens clamps pivotally mounted on the upwardly turned trunnions, a nose grip member having a lug mounted to swing on said downwardly extending trunnion, a stop for limiting both the forward and rearward swing of said lens clamps, an operating stop on said grips through which they are operated by the swing of said lenses, and separate springs acting upon said clamps and grips.

In testimony whereof I affix my signature in presence of a witness.

WALTER A. COATES.

Witness:
HOWARD E. BARLOW.

Copies of this patent may be obtained for five cents each, by addressing the "Commissioner of Patents, Washington, D. C."